(12) United States Patent
Ono et al.

(10) Patent No.: US 9,333,486 B2
(45) Date of Patent: May 10, 2016

(54) HONEYCOMB STRUCTURE

(71) Applicant: NGK Insulators, Ltd., Nagoya (JP)

(72) Inventors: Mitsuharu Ono, Nagoya (JP); Fumiharu Sato, Nagoya (JP); Shuji Ueda, Nagoya (JP); Hiroyuki Suenobu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/660,066

(22) Filed: Mar. 17, 2015

(65) Prior Publication Data

US 2015/0273436 A1    Oct. 1, 2015

(30) Foreign Application Priority Data

Mar. 26, 2014    (JP) .................. 2014-063841

(51) Int. Cl.
*B01J 21/00*    (2006.01)
*B01J 21/04*    (2006.01)
(Continued)

(52) U.S. Cl.
CPC .............. *B01J 21/16* (2013.01); *B01D 46/2418* (2013.01); *B01D 53/945* (2013.01); *B01J 21/12* (2013.01); *B01J 23/30* (2013.01); *B01J 35/0006* (2013.01); *B01J 35/04* (2013.01); *C04B 35/14* (2013.01); *C04B 35/62665* (2013.01); *C04B 35/6316* (2013.01); *C04B 38/0006* (2013.01); *C04B 38/0074* (2013.01); *C04B 38/0096* (2013.01); *C04B 38/067* (2013.01); *F01N 3/0222* (2013.01); *B01D 2255/2092* (2013.01); *B01D 2255/20707* (2013.01);

(Continued)

(58) Field of Classification Search
CPC ............ B01J 21/12; B01J 21/16; B01J 23/30; B01J 35/04
USPC ......... 502/240, 242, 243, 248, 263, 350, 439, 502/527.19; 422/170, 177; 428/116, 149
See application file for complete search history.

(56) References Cited

U.S. PATENT DOCUMENTS 4,749,671 A *  6/1988  Saito .................. B01D 39/2017
                                                           502/177
4,854,123 A    8/1989  Inoue
(Continued)

FOREIGN PATENT DOCUMENTS

EP    2 620 215 A1    7/2013
JP    08-011194 B2    2/1996
(Continued)

OTHER PUBLICATIONS

Extended European Search Report (Application No. 15160217.4) dated Jul. 17, 2015.

*Primary Examiner* — Cam N. Nguyen
(74) *Attorney, Agent, or Firm* — Burr & Brown, PLLC (57) ABSTRACT

There is disclosed a honeycomb structure. A honeycomb structure includes a pillar-shaped honeycomb structure body having partition walls defining a plurality of cells which become through channels for a fluid and extend from a first end face to a second end face, the partition walls are constituted of a porous body having aggregates and a bonding material to bond the aggregates to one another in a state where pores are formed among the aggregates, the aggregates include molten silica particles, the bonding material includes glass, a content ratio of $SiO_2$ in the porous body is 70 mass % or more, and a thermal expansion coefficient of the porous body at 40 to 800° C. is from 1.5 to $6.0 \times 10^{-6}$/° C.

8 Claims, 4 Drawing Sheets

(51) Int. Cl.
- *B01J 23/02* (2006.01)
- *B01D 3/10* (2006.01)
- *B01D 50/00* (2006.01)
- *B01D 53/34* (2006.01)
- *B32B 3/12* (2006.01)
- *G03B 21/62* (2014.01)
- *D06N 7/04* (2006.01)
- *B01J 21/16* (2006.01)
- *C04B 35/14* (2006.01)
- *C04B 38/00* (2006.01)
- *C04B 38/06* (2006.01)
- *B01D 46/24* (2006.01)
- *B01D 53/94* (2006.01)
- *B01J 21/12* (2006.01)
- *B01J 23/30* (2006.01)
- *B01J 35/00* (2006.01)
- *B01J 35/04* (2006.01)
- *F01N 3/022* (2006.01)
- *C04B 35/626* (2006.01)
- *C04B 35/63* (2006.01)

(52) U.S. Cl.
CPC ........... *B01D 2255/20723* (2013.01); *B01D 2255/20776* (2013.01); *B01D 2255/30* (2013.01); *C04B 2235/3201* (2013.01); *C04B 2235/349* (2013.01); *C04B 2235/3418* (2013.01); *C04B 2235/36* (2013.01); *C04B 2235/5436* (2013.01); *C04B 2235/9607* (2013.01); *Y10T 428/24149* (2015.01)

(56) References Cited

U.S. PATENT DOCUMENTS

| | | | | |
|---|---|---|---|---|
| 6,300,263 B1 * | 10/2001 | Merkel | ............ | C03C 10/0045 264/631 |
| 6,541,407 B2 * | 4/2003 | Beall | ............ | B01D 39/2068 264/631 |
| RE38,888 E * | 11/2005 | Beall | ............ | B01D 39/2068 264/631 |
| 7,504,359 B2 * | 3/2009 | Ogyu | ............ | B01D 46/2429 423/345 |
| 7,510,755 B2 * | 3/2009 | Masukawa | ............ | B01J 35/04 428/116 |
| 7,618,699 B2 * | 11/2009 | Beall | ............ | C04B 35/195 264/631 |
| 7,927,682 B2 * | 4/2011 | Beall | ............ | C04B 35/195 428/116 |
| 7,964,263 B2 * | 6/2011 | Kodama | ............ | C04B 38/00119 428/116 |
| 8,029,591 B2 * | 10/2011 | Ohno | ............ | B01D 39/2075 422/177 |
| 8,192,517 B2 * | 6/2012 | Kunieda | ............ | B01J 35/04 55/523 |
| 8,357,333 B2 * | 1/2013 | Kunieda | ............ | B01D 53/9418 422/177 |
| 8,470,430 B2 * | 6/2013 | Hiramatsu | ............ | B01J 23/63 428/116 |
| 8,658,104 B2 * | 2/2014 | Matsukawa | ............ | C04B 35/447 422/180 |
| 2005/0202971 A1 | 9/2005 | DiFrancesco et al. | | |
| 2005/0272602 A1 * | 12/2005 | Ninomiya | ............ | B01D 39/2068 502/439 |
| 2006/0251909 A1 | 11/2006 | Beall et al. | | |
| 2009/0004431 A1 * | 1/2009 | Ninomiya | ............ | B01D 39/2068 428/116 |
| 2010/0284877 A1 | 11/2010 | DiFrancesco et al. | | |
| 2012/0251402 A1 * | 10/2012 | Goto | ............ | B01D 46/2474 422/180 |
| 2015/0266779 A1 * | 9/2015 | Miyairi | ............ | B01D 39/2075 428/116 |

FOREIGN PATENT DOCUMENTS

| | | |
|---|---|---|
| JP | 2675321 B2 | 11/1997 |
| JP | 02-172861 A1 | 7/1999 |

* cited by examiner

HONEYCOMB STRUCTURE

The present application is an application based on JP2014-63841 filed with Japan Patent Office on Mar. 26, 2014, the entire contents of which are incorporated herein by reference.

BACKGROUND OF THE INVENTION

1. Field of the Invention

The present invention relates to a honeycomb structure, and more particularly, it relates to a honeycomb structure for use to purify an exhaust gas emitted from a diesel engine.

2. Background Art

A technology to purify an exhaust gas of a gasoline engine is based on an engine operated at a stoichiometric air-fuel ratio and a technology of a three-way catalyst to simultaneously purify HC, CO and $NO_x$. On the other hand, a diesel engine is operated in oxygen excessive atmosphere, and hence the abovementioned three-way catalyst does not function and $NO_x$ cannot be reduced in oxygen excessive atmosphere.

An example of a technology to reduce $NO_x$ in oxygen excessive atmosphere is a technology of selective catalytic reduction (SCR). In the selective catalytic reduction (SCR), $NO_x$ is reduced by using ammonia as a reducing agent. This technology is developed as a technology to purify an exhaust gas from a stationary emission source such as a power generating plant, and a titania-vanadia based catalyst has been used. Hereinafter, the catalyst for use in the selective catalytic reduction will be referred to as the "SCR catalyst" sometimes. "SCR" is an abbreviation for "Selective Catalytic Reduction".

The highly effective purification of $NO_x$ emitted from the diesel engine is required and hence the technology to purify the exhaust gas from the stationary emission source is investigated to apply to a diesel vehicle. There are developed a technology to load the titania-vanadia based catalyst to a cordierite honeycomb in the same manner as in the three-way catalyst (Patent Document 1) and a technology to form the titania-vanadia based catalyst in the honeycomb structure in the same manner as in the catalyst for the stationary emission source (Patent Document 2).

[Patent Document 1] JP-B-H08-11194
[Patent Document 2] JP-B-2675321

SUMMARY OF THE INVENTION

As an SCR catalyst, a "catalyst including titanium oxide as a main component and further including tungsten oxide and vanadium oxide" as the other catalyst components has attracted attention. Such a catalyst has a problem that it is difficult to inhibit the catalyst from peeling off from partition walls, even when such a technology to adjust an amount of the catalyst to be loaded, particle diameters of the catalyst and an open frontal area or fine pore volume of the partition walls constituting a honeycomb structure as described in Patent Document 1 is used. A reason for the problem is as follows. First, a thermal expansion coefficient of the conventional honeycomb structure constituted of cordierite is about $0.08 \times 10^{-6}/°C$. ($550°C$.). On the other hand, the thermal expansion coefficient of the honeycomb structure coated with the "catalyst including titanium oxide as the main component and further including tungsten oxide and vanadium oxide" is $0.35 \times 10^{-6}/°C$. ($550°C$.) and the thermal expansion coefficient noticeably varies before and after the honeycomb structure is coated with the above catalyst. That is, when the honeycomb structure is coated with the above catalyst, the thermal expansion coefficient of the honeycomb structure constituted of cordierite increases. This is supposedly because the thermal expansion coefficient of the above catalyst has a higher value (specifically, $6.0 \times 10^{-6}/°C$., $550°C$.) than the thermal expansion coefficient of cordierite. Therefore, even when such a technology as described in Patent Document 1 is used for the use of the above catalyst, there is a limit to the inhibition of the catalyst from peeling off from the partition walls. In consequence, there is highly demanded development of an inventive technology capable of effectively inhibiting the catalyst from peeling off from the partition walls, even if the above catalyst having a comparatively high thermal expansion coefficient is loaded.

The present invention has been developed in view of the abovementioned problem, and an object thereof is to provide a honeycomb structure which is suitably usable as a catalyst support or a filter for use to purify an exhaust gas emitted from an internal combustion engine such as a diesel engine or each type of combustion device. In particular, an object of the present invention is to provide a honeycomb structure in which a catalyst can effectively be inhibited from peeling off from partition walls, even if a catalyst having a comparatively high thermal expansion coefficient as in a catalyst including titanium oxide as a main component and further including tungsten oxide and vanadium oxide is loaded.

To achieve the abovementioned objects, according to the present invention, there is provided a honeycomb structure as follows.

[1] A honeycomb structure including a pillar-shaped honeycomb structure body having partition walls defining a plurality of cells which become through channels for a fluid and extend from a first end face to a second end face, wherein the partition walls are constituted of a porous body having aggregates and a bonding material to bond the aggregates to one another in a state where pores are formed among the aggregates, the aggregates include molten silica particles, the bonding material includes glass, a content ratio of $SiO_2$ in the porous body is 70 mass % or more, and a thermal expansion coefficient of the porous body at 40 to $800°C$. is from 1.5 to $6.0 \times 10^{-6}/°C$.

[2] The honeycomb structure according to the above [1], wherein porosity of the partition walls is from 10 to 60%.

[3] The honeycomb structure according to the above [1] or [2], wherein a mass ratio of an alkali metal included in the porous body is 10 mass % or less.

[4] The honeycomb structure according to any one of the above [1] to [3], which further includes a catalyst loaded onto at least one of each surface of the partition walls and each pore formed in the partition walls, and including titanium oxide as a main component and further including tungsten oxide and vanadium oxide.

In a honeycomb structure of the present invention, partition walls of a honeycomb structure body are constituted of a porous body having aggregates and a bonding material to bond the aggregates to one another in a state where pores are formed among the aggregates. Furthermore, in this porous body, the aggregates include molten silica particles and the bonding material includes glass. In the honeycomb structure of the present invention, a content ratio of $SiO_2$ in the porous body is 70 mass % or more and a thermal expansion coefficient of this porous body at 40 to $800°C$. is from 1.5 to $6.0 \times 10^{-6}/°C$. The honeycomb structure of the present invention is suitably usable as a catalyst support or a filter for use to purify an exhaust gas emitted from an internal combustion engine such as a diesel engine or each type of combustion device. In particular, the honeycomb structure of the present invention has a higher thermal expansion coefficient of the honeycomb structure than a conventional honeycomb structure constituted of cordierite. Therefore, also when a catalyst having a comparatively high thermal expansion coefficient as in a catalyst including titanium oxide as a main component and including tungsten oxide and vanadium oxide is loaded, the catalyst can effectively be inhibited from peeling off from the partition walls caused by a temperature change. Furthermore, because an "effect of" inhibiting the catalyst from peeling off in the present invention noticeably comes from the thermal expansion coefficient in the material of the porous body constituting the partition walls, a thickness of the partition walls, porosity of the partition walls and the like are less restricted, and a degree of freedom in design of the honeycomb structure increases.

DESCRIPTION OF THE PREFERRED EMBODIMENTS

Next, a mode for carrying out the present invention will be described in detail with reference to the drawings. However, it should be understood that the present invention is not limited to the following embodiments and that a change, an improvement or the like of design is suitably added on the basis of ordinary knowledge of a person skilled in the art without departing from the gist of the present invention.

Figure 1:
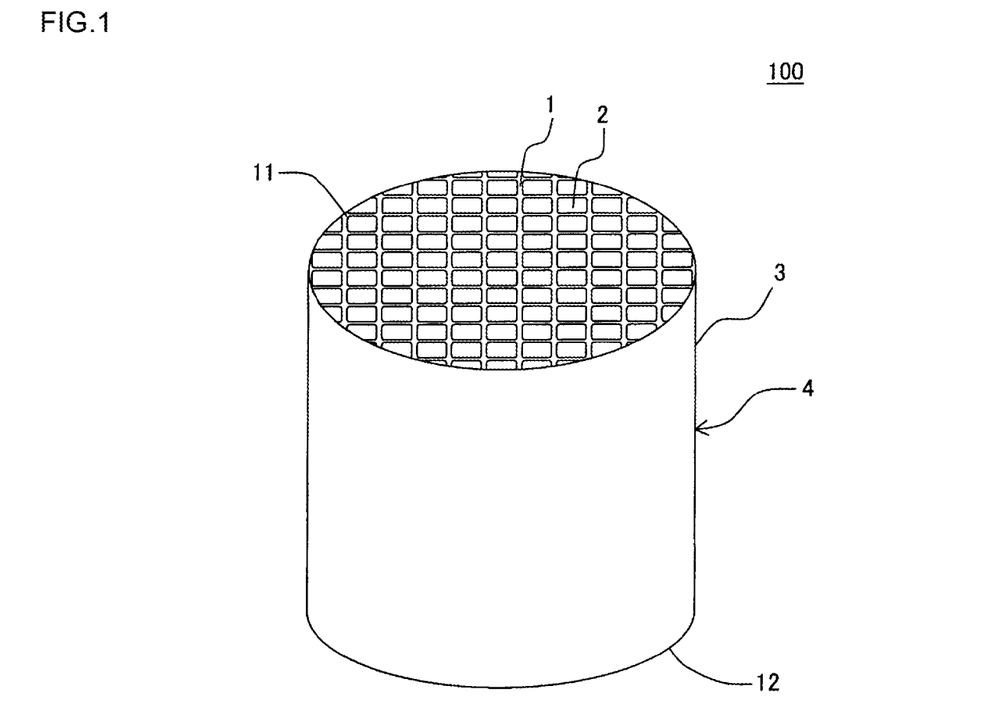
FIG. 1 is a schematic perspective view of one embodiment of a honeycomb structure of the present invention seen from an inflow end face side.
Figure 2:
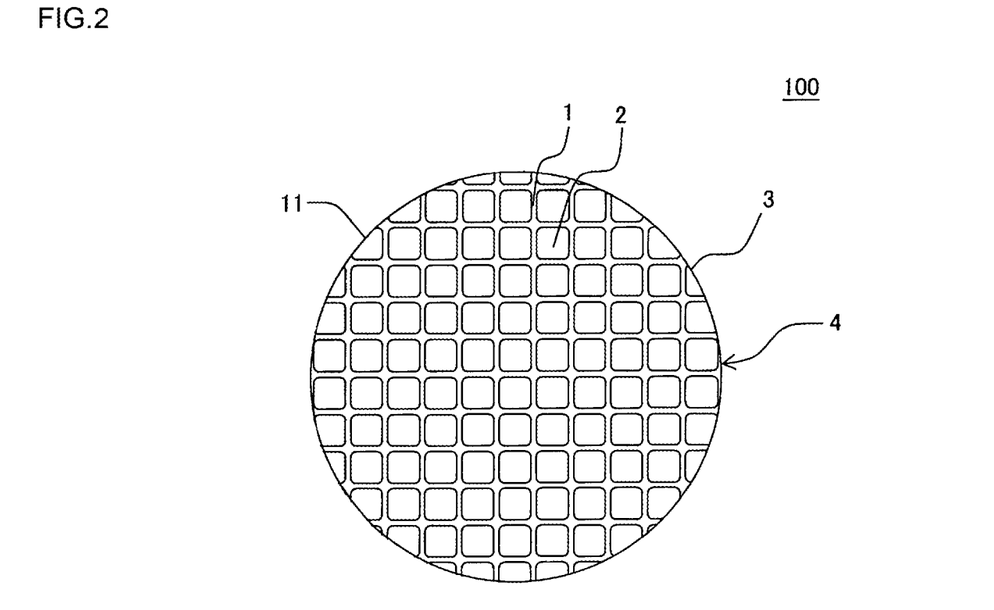
FIG. 2 is a schematic plan view of the honeycomb structure shown in FIG. 1 and seen from the inflow end face side.
Figure 3:
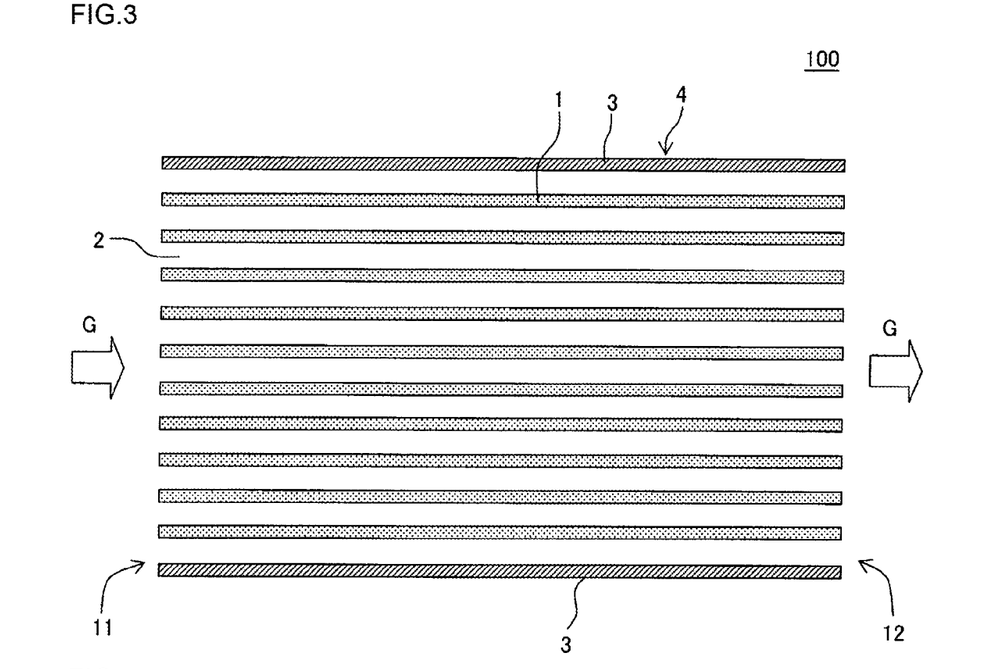
FIG. 3 is a schematic sectional view showing a cross section of the honeycomb structure shown in FIG. 1 which is parallel to a cell extending direction.
Figure 4:
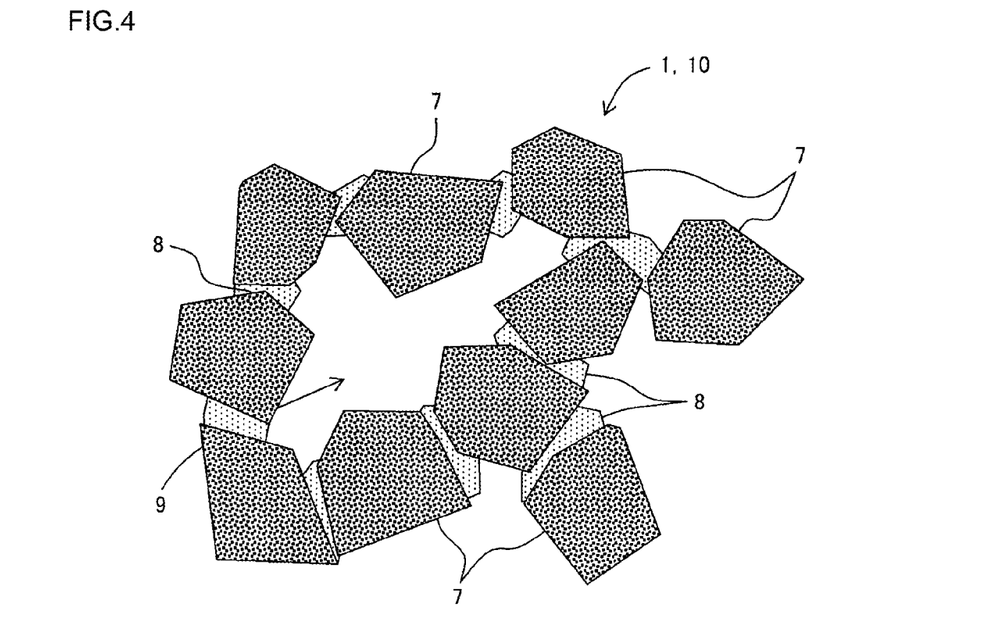
FIG. 4 is an enlarged schematic view schematically showing a porous body constituting partition walls.

(1) Honeycomb Structure:

One embodiment of a honeycomb structure of the present invention is a honeycomb structure 100 including a pillar-shaped honeycomb structure body 4 having partition walls 1 defining a plurality of cells 2 which become through channels for a fluid and extend from a first end face 11 to a second end face 12 as shown in FIG. 1 to FIG. 3. In the honeycomb structure 100 of the present embodiment, as shown in FIG. 4, the partition walls 1 constituting the honeycomb structure body 4 are constituted of a porous body 10 having aggregates 7 and a bonding material 8 to bond the aggregates 7 to one another in a state where pores 9 are formed among the aggregates 7. Furthermore, in the honeycomb structure 100 of the present embodiment, the aggregates 7 include molten silica particles and the bonding material 8 includes glass. In the honeycomb structure 100 shown in FIG. 1 to FIG. 3, the partition walls 1 of the honeycomb structure body 4 are formed of the porous body 10 (see FIG. 4) in which the "molten silica particles" as the aggregates 7 (see FIG. 4) are bonded by using the "glass" as the bonding material 8 (see FIG. 4). In the honeycomb structure 100 of the present embodiment, a content ratio of $SiO_2$ in the porous body constituting the partition walls 1 is 70 mass % or more and a thermal expansion coefficient of the porous body at 40 to 800° C. is from 1.5 to $6.0\times10^{-6}$/° C.

The honeycomb structure 100 is suitably usable as a catalyst support or a filter for use to purify an exhaust gas emitted from a diesel engine. Particularly, in the honeycomb structure 100 of the present embodiment, the thermal expansion coefficient of the porous body at 40 to 800° C. is from 1.5 to $6.0\times10^{-6}$/° C., and the partition walls 1 (i.e., the porous body 10 (see FIG. 4)) have a higher thermal expansion coefficient, as compared with a conventional honeycomb structure constituted of cordierite. Therefore, even when a catalyst having a comparatively high thermal expansion coefficient as in a catalyst including titanium oxide as a main component and further including tungsten oxide and vanadium oxide is loaded, the catalyst can effectively be inhibited from peeling off from the partition walls 1 caused by a temperature change. Furthermore, in the honeycomb structure 100, a thickness of the partition walls 1, porosity of the partition walls 1 and the like are less restricted, and a degree of freedom in design of the honeycomb structure 100 increases. Hereinafter, in the present description, when the "thermal expansion coefficient" is simply mentioned, the thermal expansion coefficient at 40 to 800° C. is meant unless otherwise specifically noted.

Here, FIG. 1 is a schematic perspective view of one embodiment of the honeycomb structure of the present invention seen from an inflow end face side. FIG. 2 is a schematic plan view of the honeycomb structure shown in FIG. 1 and seen from the inflow end face side. FIG. 3 is a schematic sectional view showing a cross section of the honeycomb structure shown in FIG. 1 which is parallel to a cell extending direction. FIG. 4 is an enlarged schematic view schematically showing the porous body constituting the partition walls. The honeycomb structure 100 shown in FIG. 1 to FIG. 3 further has a circumferential wall 3 positioned at the outermost circumference of the honeycomb structure body 4.

The aggregates of the porous body constituting the partition walls include the molten silica particles. When the molten silica particles are used as the aggregates, an excessive rise of the thermal expansion coefficient of the porous body can be inhibited. That is, the glass as the bonding material has a higher thermal expansion coefficient than cordierite, but when the glass is only used, the thermal expansion coefficient of the honeycomb structure excessively heightens sometimes. Furthermore, when the honeycomb structure only constituted of the glass is used as a catalyst carrier, strength excessively lowers sometimes. When the aggregates including the molten silica particles are used, the thermal expansion coefficient of the honeycomb structure has an appropriate value (i.e., from 1.5 to $6.0\times10^{-6}$/° C.), and furthermore, the strength of the honeycomb structure is so sufficient that the honeycomb structure is usable as the catalyst carrier. The molten silica particles are preferably particles in which a purity of $SiO_2$ is 95 mass % or more. In the honeycomb structure of the present embodiment, $SiO_2$ is included in the molten silica particles as the aggregates and the glass as the bonding material, and a mass ratio of $SiO_2$ included in the porous body to a total mass of the porous body is 70 mass % or more. As described above, the thermal expansion coefficient of the molten silica particles is different from that of the glass, and hence the thermal expansion coefficient of the porous body varies in accordance with a ratio between $SiO_2$ included as a component constituting the molten silica particles and $SiO_2$ included as a component constituting the bonding material. In the honeycomb structure of the present embodiment, the ratio between $SiO_2$ included as the component constituting the molten silica particles and $SiO_2$ included as the component constituting the bonding material is preferably adjusted so that the thermal expansion coefficient of the porous body is from 1.5 to $6.0 \times 10^{-6}$/° C.

The content ratio of $SiO_2$ in the porous body can be measured by fluorescent X-ray analysis, gravimetric analysis, and ICP-atomic emission spectrometry.

A measuring method of the thermal expansion coefficient of the porous body at 40 to 800° C. is as follows. First, a measurement sample having a vertical size of 5 mm×a horizontal size of 5 mm×a length of 50 mm is prepared from the honeycomb structure body of the honeycomb structure. Hereinafter, a direction from one end toward the other end of a portion of the above measurement sample which has the length of 50 mm will be referred to as a "length direction of the measurement sample" sometimes. This measurement sample is cut out from the honeycomb structure and prepared so that a cell expanding direction of the honeycomb structure body becomes the length direction of the measurement sample. An average thermal expansion coefficient of the prepared measurement sample at 40 to 800° C. is measured with a differential detection type of thermal dilatometer.

Particles constituting the aggregates are preferably substantially the molten silica particles, but aggregates other than the molten silica particles may be included. For example, a mass ratio of the molten silica particles to all the particles constituting the aggregates is preferably 20 mass % or more. According to such a constitution, the thermal expansion coefficient of the partition walls (i.e., the porous body) is suitably higher than that of cordierite or the like. Examples of the aggregates other than the molten silica particles include clay (kaolin), potsherd, and aluminum titanate.

The partition walls preferably include 10 to 60 mass % of the glass to the total mass of the aggregates and the bonding material. When the ratio of the glass is excessively small, a function of bonding the aggregate particles does not sufficiently develop sometimes. On the other hand, when the ratio of the glass is excessively large, there is a possibility that deterioration of a chemical durability or an excessive rise of the thermal expansion coefficient is caused.

A median diameter of the molten silica particles as the aggregates is preferably from 5 to 80 um. When the median diameter of the molten silica particles is excessively small, the porous body cannot be formed, and a dense body is unfavorably formed. On the other hand, when the median diameter of the molten silica particles is excessively large, a formability of the porous body unfavorably deteriorates. The median diameter of the molten silica particles can be measured through a grain size distribution by a laser diffraction/scattering method.

The bonding material of the porous body constituting the partition walls includes the glass. Examples of the glass include aluminosilicate glass, zirconia soda glass, soda glass, non-alkali glass, and borosilicate glass. When such a glass is used as the bonding material, the thermal expansion coefficient of the honeycomb structure can be heightened. In the glass as the bonding material, glass frit is preferably used as a raw material. That is, during manufacturing, the glass frit is preferably used as the raw material of the bonding material, and the glass frit and the molten silica particles are preferably mixed to prepare a forming raw material, thereby preparing the honeycomb structure. It is easy to control a melting temperature of the glass frit, and hence it becomes easy to set conditions such as a firing temperature, when a honeycomb formed body constituted of the forming raw material is fired. Furthermore, the glass frit is inexpensive and easily available as compared with a conventional ceramic raw material to prepare cordierite or the like, so that manufacturing cost of the honeycomb structure can be reduced.

A content ratio of $SiO_2$ in the porous body is 70 mass % or more and preferably 80 mass % or more. According to such a constitution, the chemical durability is suitably high. In addition, the thermal expansion coefficient of the porous body is from 1.5 to $6.0 \times 10^{-6}$/° C., but is preferably from 2.5 to $5.0 \times 10^{-6}$/° C. According to such a constitution, even when the catalyst having a comparatively high thermal expansion coefficient is loaded, a difference between the thermal expansion coefficient of the partition walls and the thermal expansion coefficient of the catalyst becomes smaller, and the catalyst can effectively be inhibited from peeling off from the partition walls.

The porous body may include an alkali metal. The alkali metal is mainly included in the glass as the bonding material sometimes. For example, when the glass as the bonding material includes Na, a softening point of the glass is effectively lowered. A mass ratio of the alkali metal to be included in the porous body may be, for example, from 0 to 10 mass %. The alkali metal to be included in the glass may be included as an oxide of $Na_2O$ or $K_2O$.

The porous body may include a component other than the alkali metal (hereinafter referred to as the "other component"). The other component is preferably included in the glass as the bonding material. Examples of the other component to be included in the glass include CaO, $Al_2O_3$, and $B_2O_3$. The porous body may include 10 mass % or less of CaO, the porous body may include 20 mass % or less of $Al_2O_3$, and the porous body may include 10 mass % or less of $B_2O_3$, which produces the effect that the softening point of the glass as the bonding material is lowered. A chemical composition (mass %) of the other component of the porous body can be measured by the fluorescent X-ray analysis, gravimetric analysis and ICP-atomic emission spectrometry.

A softening temperature of the glass as the bonding material is preferably from 400 to 1000° C., further preferably from 500 to 900° C., and especially preferably from 600 to 800° C. When the softening temperature of the glass as the bonding material is low, a firing temperature during the preparation of the honeycomb structure can be lowered and the manufacturing cost can be reduced, as compared with the conventional honeycomb structure constituted of cordierite or the like. However, when the softening temperature of the glass is excessively low, melting of the honeycomb structure easily occurs sometimes in a case where the honeycomb structure is used as an exhaust gas purifying catalyst carrier. When the softening temperature of the glass is in the above-mentioned numeric range, the honeycomb structure is suitably usable as the catalyst carrier and can further easily be manufactured.

Porosity of the partition walls is preferably from 10 to 60%, further preferably from 20 to 50%, and especially preferably from 30 to 40%. The porosity of the partition walls is porosity of the porous body constituting the partition walls of the honeycomb structure. When the porosity of the partition walls is smaller than 10%, a pressure loss of the honeycomb structure enlarges sometimes. When the porosity of the partition walls is in excess of 60%, the partition walls of the honeycomb structure easily become brittle and lacking sometimes. The porosity of the partition walls can be measured in conformity with JIS R 1655 by mercury porosimetry.

A median diameter (a central pore diameter) of the partition walls is preferably from 1 to 30 μm, further preferably from 1 to 20 μm, and especially preferably from 5 to 10 μm. When the median diameter of the partition walls is smaller than 1 μm, the pressure loss of the honeycomb structure enlarges sometimes. When the median diameter of the partition walls is in excess of 30 μm, the partition walls of the honeycomb structure easily become brittle and lacking sometimes. The median diameter of the partition walls can be measured in conformity with JIS R 1655 by the mercury porosimetry.

There is not any special restriction on a thickness of the partition walls of the honeycomb structure body, but the thickness is preferably from 30 to 330 μm, further preferably from 50 to 270 μm, and especially preferably from 100 to 230 μm. When the thickness of the partition walls is in such a range, a rise of the pressure loss can be inhibited while keeping the strength of the partition walls of the honeycomb structure.

There is not any special restriction on a cell density of the honeycomb structure body, but the cell density is preferably from 5 to 200 cells/cm$^2$, further preferably from 15 to 160 cells/cm$^2$, and especially preferably from 30 to 100 cells/cm$^2$. When the cell density is in such a range, it is possible to improve a purifying efficiency in a case where the honeycomb structure is used as the catalyst carrier.

There is not any special restriction on a shape of each cell formed in the honeycomb structure body. Here, the "cell shape" is the shape of the cells in a cross section of the honeycomb structure body which is perpendicular to the cell extending direction. Examples of the cell shape include a quadrangular shape, a hexagonal shape, an octagonal shape, and any combination of these shapes.

There is not any special restriction on a shape of the honeycomb structure body, and examples of the shape include a pillar shape (a round pillar shape) in which a bottom surface is circular, a pillar shape in which a bottom surface is oval, and a pillar shape in which a bottom surface has a polygonal shape (a quadrangular shape, a pentangular shape, a hexagonal shape, a heptagonal shape, an octagonal shape or the like).

A length of the honeycomb structure body from the first end face to the second end face and a size of the cross section of the honeycomb structure body which is perpendicular to the cell extending direction may suitably be selected so that an optimum purification performance can be obtained, for example, when the honeycomb structure is used as the exhaust gas purifying catalyst carrier. For example, the length of the honeycomb structure body from the first end face to the second end face is preferably from 50 to 440 mm and further preferably from 100 to 360 mm. An area of the cross section of the honeycomb structure body which is perpendicular to the cell extending direction is preferably from 50 to 440 mm$^2$ and further preferably from 100 to 360 mm$^2$ A-axis compressive strength of the honeycomb structure is preferably 5 MPa or more, further preferably 10 MPa or more, and especially preferably 15 MPa or more. Here, the A-axis compressive strength is a compressive strength (MPa) stipulated in JASO Standard M505-87 which is a car standard issued by the society of Automotive Engineers of Japan. The A-axis compressive strength can be measured by the following method. First, a sample (a small honeycomb structure) having a diameter of 25.4 mm and a height of 25.4 mm is cut out from the honeycomb structure and a compression load is loaded in a through channel direction of the sample. A pressure when the sample is broken by gradually enlarging the compression load is obtained as the "A-axis compressive strength (MPa)".

Figure 5:
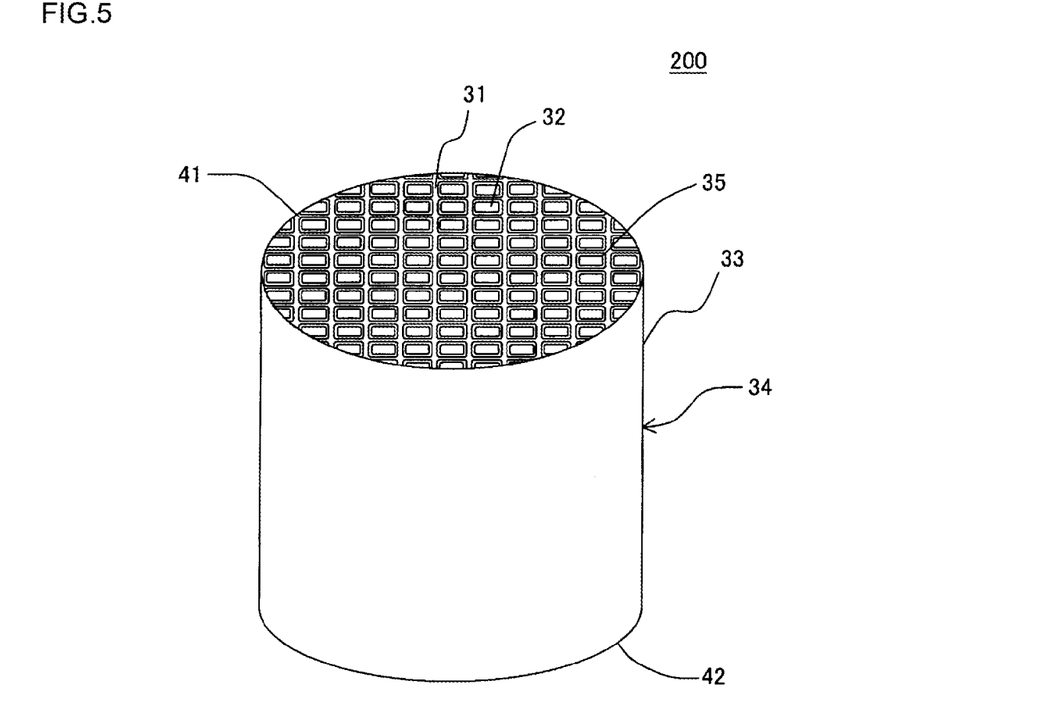
FIG. 5 is a schematic perspective view of another embodiment of the honeycomb structure of the present invention seen from an inflow end face side.
Figure 6:
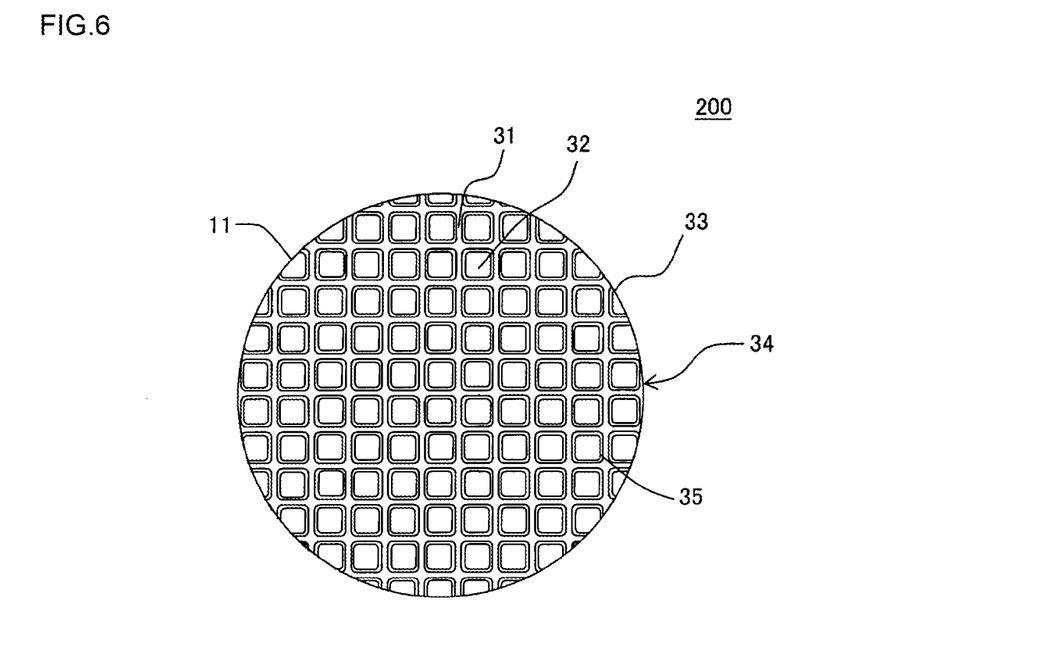
FIG. 6 is a schematic plan view of the honeycomb structure shown in FIG. 5 and seen from the inflow end face side.
Figure 7:
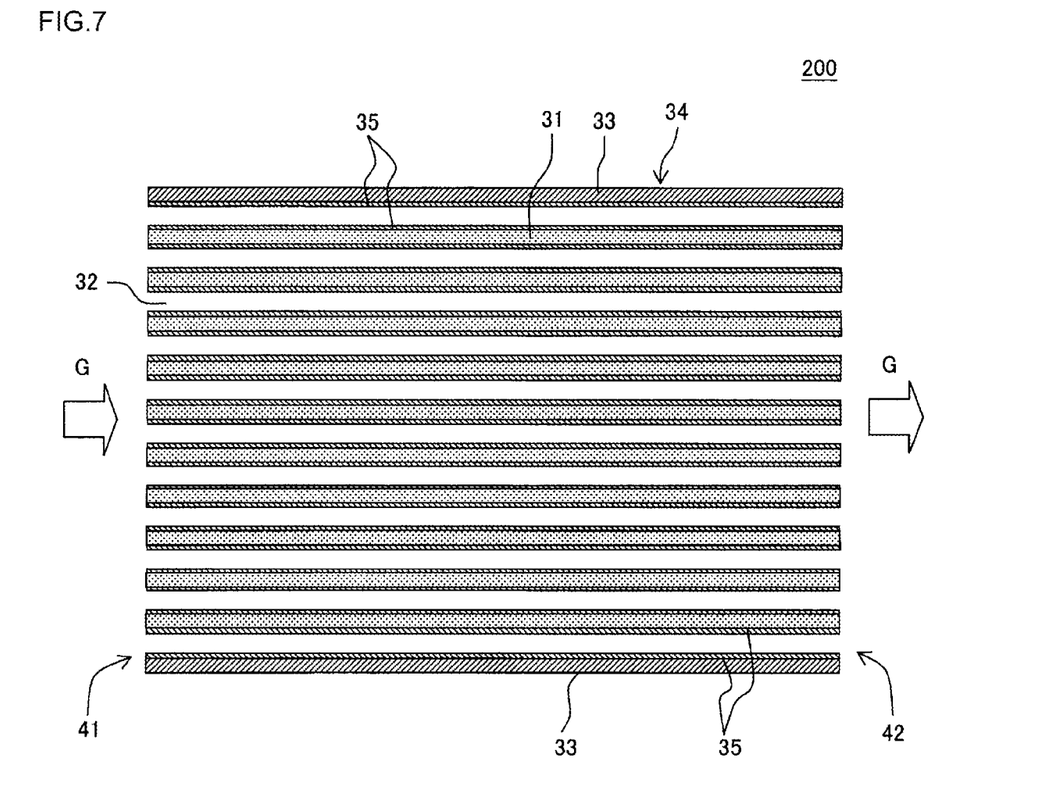
FIG. 7 is a schematic sectional view showing a cross section of the honeycomb structure shown in FIG. 5 which is parallel to a cell extending direction.

As shown in FIG. 5 to FIG. 7, a honeycomb structure 200 may include a pillar-shaped honeycomb structure body 34 and an exhaust gas purifying catalyst 35. Here, the catalyst 35 is loaded onto at least one of each surface of partition walls 31 and each pore formed in the partition walls 31. Hereinafter, when the catalyst 35 is loaded onto at least one of each surface of the partition walls 31 and each pore formed in the partition walls 31, it is simply described sometimes that the "catalyst 35 is loaded onto the partition walls 31". The honeycomb structure body 34 has a constitution similar to that of the honeycomb structure body 4 shown in FIG. 1 to FIG. 3. That is, the honeycomb structure body 34 has the partition walls 31 defining a plurality of cells 32 which become through channels for a fluid and extend from a first end face 41 to a second end face 42. Furthermore, the partition walls 31 constituting the honeycomb structure body 34 are constituted of a porous body having aggregates and a bonding material to bond the aggregates to one another in a state where the pores are formed among the aggregates, the aggregates include molten silica particles, and the bonding material includes glass. Here, FIG. 5 is a schematic perspective view of another embodiment of the honeycomb structure of the present invention seen from an inflow end face side. FIG. 6 is a schematic plan view of the honeycomb structure shown in FIG. 5 and seen from the inflow end face side. FIG. 7 is a schematic sectional view showing a cross section of the honeycomb structure shown in FIG. 5 which is parallel to a cell extending direction.

An example of the exhaust gas purifying catalyst 35 is a catalyst including titanium oxide as a main component and further including tungsten oxide and vanadium oxide. The catalyst including titanium oxide as the main component and further including tungsten oxide and vanadium oxide is a catalyst having a comparatively high thermal expansion coefficient. Therefore, when the catalyst is loaded onto partition walls of a conventional honeycomb structure, there is a problem that the catalyst easily peels off from the partition walls. In the present invention, the partition walls are constituted of the porous body including molten silica particles as the aggregates and including the glass as the bonding material, and hence a thermal expansion coefficient of the honeycomb structure can be heightened. Therefore, even when the catalyst including titanium oxide as the main component and further including tungsten oxide and vanadium oxide is loaded as the catalyst 35 onto the partition walls 31 as in the honeycomb structure 200 shown in FIG. 5 to FIG. 7, the catalyst 35 can effectively be inhibited from peeling off from the partition walls 31.

In the honeycomb structure of the present embodiment, as the exhaust gas purifying catalyst, for example, catalysts of the following (a) to (c) are suitably usable: (a) a composite metal oxide made of tungsten oxide, cerium oxide, titanium oxide and zirconium oxide; (b) a catalyst containing a titania-zirconia type composite oxide and a metal; and (c) a catalyst of an oxide of V, Cr, Ni, Cu or the like loaded onto $TiO_2$. A thermal expansion coefficient of a catalyst layer constituted of the above catalyst at 40 to 600° C. is generally about $6.0 \times 10^{-6}$/° C.

There is not any special restriction on an amount of the catalyst to be loaded, and the amount of the catalyst required to purify the exhaust gas is preferably loaded. For example, the amount of the catalyst including titanium oxide as the main component and further including tungsten oxide and vanadium oxide to be loaded is preferably from 50 to 500 g/L and further preferably from 100 to 400 g/L. When the amount of the catalyst to be loaded is 50 g/L or more, a catalyst function sufficiently develops. When the amount of the catalyst to be loaded is 500 g/L or less, the pressure loss of the honeycomb structure does not excessively enlarge, and the rise of the manufacturing cost can be inhibited. It is to be noted that the "amount of the catalyst to be loaded" is a mass (g) of the catalyst to be loaded per unit volume (1 L) of the honeycomb structure.

(2) Manufacturing Method of Honeycomb Structure:

Next, a method of manufacturing the honeycomb structure of the present embodiment will be described. When the honeycomb structure is manufactured, a forming raw material including raw material powder which becomes the aggregates and raw material powder which becomes the bonding material is first prepared. This forming raw material is a forming raw material to prepare the partition walls (i.e., the porous body) of the honeycomb structure body.

The powder of the molten silica particles is usable as the raw material which becomes the aggregates. The glass frit is usable as the raw material which becomes the bonding material. Furthermore, kaolin particles are preferably added to the raw material powder. When the kaolin particles are added to the raw material powder, a fluidity of a kneaded material prepared from the raw material powder is improved, and a forming operation can be easily performed. In addition, clay, potsherd or the like may be added to the raw material powder. When the clay is added to the raw material powder, the fluidity of the kneaded material is improved. Additionally, a dispersing medium or an additive may further be added to the forming raw material, in addition to the abovementioned raw materials.

A median diameter of the molten silica particles as the raw material powder is preferably from 5 to 80 When the median diameter of the molten silica particles is smaller than 5 μm, the porosity unfavorably lowers. When the median diameter of the molten silica particles is in excess of 80 μm, the formability unfavorably deteriorates. The median diameter of the molten silica particles is a value measured by laser diffractometry.

A median diameter of the glass frit as the raw material powder is preferably 80 μm or less. When the median diameter of the glass frit is in excess of 40 the formability unfavorably deteriorates. The median diameter of the glass fit is a value measured by the laser diffractometry.

There is not any special restriction on kaolin and clay particles as the raw material powder, but a median diameter thereof is preferably 80 μm or less, further preferably 40 μm or less, and especially preferably 10 μm or less. When the kaolin particles having such a median diameter are used, the fluidity of the kneaded material prepared from the raw material powder suitably improves.

There is not any special restriction on a blend ratio of the raw material powder, but a blend ratio of the molten silica particles is preferably from 20 to 80 mass %, a blend ratio of the glass frit is preferably from 20 to 80 mass %, and a blend ratio of the kaolin particles is preferably from 10 to 50 mass %. It is to be noted that the above blend ratios are set so that a total of the respective blend ratios of the molten silica particles, the glass frit and the kaolin particles is 100 mass %.

Examples of the additive include a binder and a pore former. An example of the dispersing medium is water.

Examples of the binder include methylcellulose, hydroxypropoxyl cellulose, hydroxyethyl cellulose, carboxymethylcellulose, and polyvinyl alcohol. There is not any special restriction on the pore former, as long as the pore former becomes pores after fired, and examples of the pore former include starch, a foamable resin, a water absorbable resin, silica gel, and wood chips.

Particle diameters of the raw material powder and an amount of the powder to be blended as well as particle diameters of powder of the pore former to be added and an amount of the powder to be blended are regulated, so that the porous body having desirable porosity and median diameter can be obtained.

Next, the obtained forming raw material is kneaded to form a kneaded material. There is not any special restriction on a method of forming the kneaded material, and an example of the method is a method in which a kneader, a vacuum pugmill or the like is used.

Next, the obtained kneaded material is extruded to prepare a honeycomb formed body. The extrusion can be performed by using a die having a desirable cell shape, partition wall thickness and cell density. Next, the obtained honeycomb formed body may be dried to obtain a honeycomb dried body prepared by drying the honeycomb formed body. There is not any special restriction on a drying method, but examples of the method include hot air drying, microwave drying, dielectric drying, reduced-pressure drying, vacuum drying, and freeze drying. Among these methods, the dielectric drying, the microwave drying or the hot air drying is preferably performed alone or any combination thereof is preferably performed. Furthermore, as drying conditions, a drying temperature is preferably from 30 to 150° C. and a drying time is preferably from one minute to two hours.

Next, the honeycomb formed body or the honeycomb dried body is fired. The obtained honeycomb fired body becomes the honeycomb structure of the present embodiment. A firing temperature is preferably from 400 to 1400° C. and further preferably from 600 to 1200° C. When the firing temperature is lower than 400° C., the glass frit as the bonding material is not sufficiently dissolved and the aggregates are disadvantageously insufficiently bonded to one another. On the other hand, when the firing temperature is in excess of 1400° C., cristobalite is generated, and the thermal expansion coefficient excessively rises, or energy consumption of a furnace excessively enlarges sometimes. Furthermore, a firing time at the highest temperature is preferably from about 30 minutes to eight hours. The firing can be performed in, for example, an air atmosphere, a steam atmosphere, or a hydrocarbon gas combustion atmosphere.

EXAMPLES

Hereinafter, the present invention will further specifically be described in accordance with examples, but the present invention is not limited to these examples.

Example 1

In Example 1, first, a forming raw material was prepared by using molten silica particles, glass frit, and kaolin particles. As to blend ratios of the respective components in the forming raw material, the ratio of the molten silica particles was 50 mass %, the ratio of the glass frit was 30 mass %, and the ratio of the kaolin particles was 20 mass %. A median diameter of the molten silica particles was 15 μm, a median diameter of the glass frit was 10 μm, and a median diameter of the kaolin particles was 5 μm. As the glass frit, glass frit constituted of aluminosilicate glass was used. The glass frit used in Example 1 was "aluminosilicate glass A". A column of "glass type" of Table 1 shows the type of glass frit used in preparing the forming raw material. Furthermore, a column of "clay" of Table 1 shows components other than the molten silica particles and glass frit used in preparing the forming raw material. In Example 1, the abovementioned kaolin particles corresponded to this clay. A column of "blend ratio (mass %) of glass" of Table 1 shows the blend ratio of the glass frit. A column of "blend ratio (mass %) of silica" of Table 1 shows the blend ratio of the molten silica particles.

TABLE 1

| Porous body | Glass type | Clay | Firing temp. (° C.) | Blend ratio of glass (mass %) | Blend ratio of silica (mass %) | Blend ratio of clay (mass %) |
|---|---|---|---|---|---|---|
| Example 1 | Molten silica particles + glass | Aluminosilicate glass A | Kaolin | 1000 | 30 | 50 | 20 |
| Example 2 | Molten silica particles + glass | Aluminosilicate glass A | Clay | 1000 | 30 | 50 | 20 |
| Example 3 | Molten silica particles + glass | Aluminosilicate glass B | Kaolin | 1000 | 30 | 50 | 20 |
| Example 4 | Molten silica particles + glass | Aluminosilicate glass A | Kaolin | 1000 | 40 | 45 | 15 |
| Example 5 | Molten silica particles + glass | Aluminosilicate glass B | Clay | 1000 | 30 | 50 | 20 |
| Example 6 | Molten silica particles + glass | Aluminosilicate glass B | Kaolin | 1000 | 20 | 60 | 20 |
| Example 7 | Molten silica particles + glass | Aluminosilicate glass B | Kaolin | 1000 | 10 | 70 | 20 |
| Example 8 | Molten silica particles + glass | Soda glass | Clay | 900 | 60 | 30 | 10 |
| Example 9 | Molten silica particles + glass | Soda glass | Clay | 700 | 60 | 30 | 10 |
| Example 10 | Molten silica particles + glass | Soda glass | Clay | 700 | 40 | 50 | 10 |
| Example 11 | Molten silica particles + glass | Soda glass | Clay | 1000 | 20 | 50 | 30 |
| Example 12 | Molten silica particles + glass | Soda glass | Clay | 900 | 20 | 50 | 30 |
| Example 13 | Molten silica particles + glass | Soda glass | Clay | 800 | 20 | 50 | 30 |
| Example 14 | Molten silica particles + glass | Soda glass | Clay | 700 | 20 | 50 | 30 |
| Comparative Example 1 | Molten silica particles + glass | Aluminosilicate glass A | Kaolin | 1100 | 30 | 50 | 20 |
| Comparative Example 2 | Molten silica particles + glass | Aluminosilicate glass A | Kaolin | 1200 | 30 | 50 | 20 |
| Comparative Example 3 | Molten silica particles + glass | Soda glass | Clay | 1000 | 60 | 30 | 10 |
| Comparative Example 4 | Molten silica particles + glass | Soda glass | Clay | 1000 | 40 | 50 | 10 |
| Comparative Example 5 | Molten silica particles + glass | Soda glass | Kaolin | 1000 | 10 | 70 | 20 |
| Reference Example 1 | Solid type catalyst | — | — | — | — | — | — |
| Comparative Example 6 | Cordierite | — | — | — | — | — | — |

Furthermore, chemical components of the "aluminosilicate glass A" used as the glass fit were measured by gravimetric analysis and ICP-atomic emission spectrometry. Table 2 shows the chemical components of the aluminosilicate glass A.

TABLE 2

| Chemical components | Aluminosilicate glass A | Aluminosilicate glass B | Soda glass |
|---|---|---|---|
| $SiO_2$ (mass %) | 61.9 | 61.4 | 71.6 |
| $Al_2O_3$ (mass %) | 17.8 | 19.5 | 1.3 |
| CaO (mass %) | 7.6 | 0.1 | 8.1 |
| $Na_2O$ (mass %) | 0.1 | 13.1 | 13.6 |
| $B_2O_3$ (mass %) | 8.9 | 2.7 | 0.0 |

In Example 1, the abovementioned molten silica particles, glass frit and kaolin particles were used, and additionally, a water absorbable resin as a pore former, methylcellulose as a binder and an appropriate amount of water were added.

Next, the obtained forming raw material was kneaded with a kneader and then kneaded with a vacuum pugmill to form a kneaded material. Next, the obtained kneaded material was extruded to prepare a honeycomb formed body. The honeycomb formed body was prepared so as to obtain a partition wall thickness of 170 μm and a cell density of 62 cells/cm² after fired. Next, the honeycomb formed body was dried to obtain a honeycomb dried body. As to the drying, microwave drying was first performed and then hot air drying was performed. Next, the honeycomb dried body was cut so that a length of the honeycomb dried body in a cell extending direction was a predetermined length. Next, the obtained honeycomb dried body was degreased. The degreasing was performed at 400° C. in the air atmosphere for two hours. Next, the degreased honeycomb dried body was fired to obtain a honeycomb structure. The firing was performed at 1000° C. in the air atmosphere for two hours. The obtained honeycomb structure had a round pillar shape in which a diameter of each end face was 144 mm and a length in the cell extending direction was 153 mm. Furthermore, the obtained honeycomb structure had a circumferential wall having a thickness of 0.52 mm at the outermost circumference of a honeycomb structure body. Additionally, partition walls of the obtained honeycomb structure were constituted of a porous body having molten silica particles as aggregates, and glass to bond the molten silica particles to one another in a state where pores were formed among the molten silica particles. As to the honeycomb structure having the partition walls constituted of such a porous body, a column of "porous body" of Table 1 shows the "molten silica particles+the glass".

As to the obtained honeycomb structure, a "porosity (%)", a "thermal expansion coefficient $(\times 10^{-6}/° C.)$", "A-axis compressive strength (MPa)" and a "median diameter (μm)" were measured by the following methods. Table 3 shows the measurement results.

[Porosity]

As the porosity (%), the porosity of the partition walls of the honeycomb structure was measured by mercury porosimetry (JIS R 1655).

[Thermal Expansion Coefficient $(\times 10^{-6}/° C.)$]

The thermal expansion coefficient $(\times 10^{-6}/° C.)$ was obtained by measuring an average thermal expansion coefficient $(\times 10^{-6}/° C.)$ of the porous body constituting the partition walls at 40 to 800° C. with a differential detection type of thermal dilatometer. Specifically, a measurement sample having a vertical size of 5 mm×a horizontal size of 5 mm×a length of 50 mm was first prepared from the honeycomb structure body of the honeycomb structure. A length direction of this measurement sample corresponded to the cell extending direction of the honeycomb structure body. Next, the average thermal expansion coefficient of the prepared measurement sample at 40 to 800° C. was measured with the differential detection type of thermal dilatometer.

[A-Axis Compressive Strength (MPa)]

First, a sample having a diameter of 25.4 mm and a height of 25.4 mm (a small honeycomb structure) was cut out from the honeycomb structure, and a compression load was loaded in a through channel direction of the sample. A pressure when the sample was broken by gradually enlarging the compression load was obtained as the "A-axis compressive strength (MPa)".

[Median Diameter (μm)]

As the median diameter (μm), the median diameter of the partition walls of the honeycomb structure was measured by the mercury porosimetry (JIS R 1655).

Furthermore, chemical components of the honeycomb structure of Example 1 were measured by fluorescent X-ray analysis, gravimetric analysis and ICP-atomic emission spectrometry. Table 3 shows the chemical components of the honeycomb structure of Example 1.

TABLE 3

|  | Porosity (%) | Thermal expansion coefficient (40 to 800° C.) ($\times 10^{-6}$/° C.) | A-axis compressive strength (MPa) | Median dia. (μm) | Partition wall thickness (μm) | Cell density (cells/cm$^3$) | Dia. (mm) |
|---|---|---|---|---|---|---|---|
| Example 1 | 45 | 2.7 | 5.8 | 1.7 | 170 | 62 | 144 |
| Example 2 | 37 | 4.5 | 15.6 | 1.2 | 170 | 62 | 144 |
| Example 3 | 18 | 3.7 | 12 | 2.1 | 170 | 62 | 144 |
| Example 4 | 47 | 3.2 | 7.7 | 4.0 | 170 | 62 | 70 |
| Example 5 | 45 | 3.7 | 5.5 | 3.2 | 170 | 62 | 70 |
| Example 6 | 49 | 2.9 | 0.5 | 1.9 | 170 | 62 | 70 |
| Example 7 | 52 | 1.9 | 0.5 | 1.3 | 170 | 62 | 70 |
| Example 8 | 4.8 | 3.7 | 92 | 32 | 304 | 76 | 70 |
| Example 9 | 31 | 4.5 | 1.7 | 0.4 | 304 | 76 | 70 |
| Example 10 | 35 | 4.7 | 1.7 | 0.4 | 304 | 76 | 70 |
| Example 11 | 24 | 3.1 | 24 | 0.9 | 170 | 62 | 70 |
| Example 12 | 25 | 2.9 | 13 | 0.3 | 170 | 62 | 70 |
| Example 13 | 25 | 2.7 | 6.7 | 0.2 | 170 | 62 | 70 |
| Example 14 | 25 | 2.5 | 3.8 | 0.2 | 170 | 62 | 70 |
| Comparative Example 1 | 46 | 6.4 | 8.3 | 7.2 | 170 | 62 | 70 |
| Comparative Example 2 | 40 | 11.1 | 13.9 | 9.6 | 170 | 62 | 70 |
| Comparative Example 3 | 0.7 | 6.2 | 20 | 22 | 304 | 76 | 70 |
| Comparative Example 4 | 24 | 6.6 | 65 | 4.2 | 304 | 76 | 70 |
| Comparative Example 5 | 51 | Unmeasurable | 0.1 | 1.2 | 170 | 62 | 70 |
| Reference Example 1 | 54 | 6.5 (to 600° C.) | 9.6 | 0.03 | 304 | 50 | 144 |
| Comparative Example 6 | 35 | 0.5 | 15 | 4.5 | 170 | 62 | 144 |

|  | Length (mm) | SiO$_2$ (mass %) | Al$_2$O$_3$ (mass %) | CaO (mass %) | Na$_2$O (mass %) | B$_2$O$_3$ (mass %) |
|---|---|---|---|---|---|---|
| Example 1 | 153 | 81 | 13 | 2 | 0 | 3 |
| Example 2 | 153 | 80 | 11 | 1 | 0 | 2 |
| Example 3 | 153 | 80 | 13 | 0 | 4 | 1 |
| Example 4 | 100 | 76 | 13 | 3 | 0 | 4 |
| Example 5 | 100 | 80 | 12 | 0 | 2 | 0 |
| Example 6 | 100 | 81 | 12 | 0 | 3 | 1 |
| Example 7 | 100 | 83 | 11 | 0 | 1 | 0 |
| Example 8 | 100 | 79 | 4 | 5 | 8 | 0 |
| Example 9 | 100 | 79 | 4 | 5 | 8 | 0 |
| Example 10 | 100 | 84 | 3 | 3 | 5 | 0 |
| Example 11 | 100 | 81 | 9 | 2 | 3 | 0 |
| Example 12 | 100 | 81 | 9 | 2 | 3 | 0 |
| Example 13 | 100 | 81 | 9 | 2 | 3 | 0 |
| Example 14 | 100 | 81 | 9 | 2 | 3 | 0 |
| Comparative Example 1 | 100 | 77 | 15 | 1 | 0 | 2 |
| Comparative Example 2 | 100 | 77 | 15 | 1 | 0 | 2 |
| Comparative Example 3 | 100 | 79 | 4 | 5 | 8 | 0 |
| Comparative Example 4 | 100 | 84 | 3 | 3 | 5 | 0 |
| Comparative Example 5 | 100 | 84 | 9 | 1 | 1 | 0 |
| Reference Example 1 | 153 | 8 | 1 | 2 | 0 | 0 |
| Comparative Example 6 | 153 | 55 | 31 | 0 | 0 | 0 |

Example 2

In Example 2, a forming raw material was first prepared by using molten silica particles, glass frit and clay. As to blend ratios of the respective components in the forming raw material, the ratio of the molten silica particles was 50 mass %, the ratio of the glass frit was 30 mass %, and the ratio of the clay was 20 mass %. As the clay, Kibushi clay was used. In Example 2, the procedures of Example 1 were repeated except that the forming raw material was prepared as described above, to prepare a honeycomb structure of Example 2. As to the obtained honeycomb structure, "porosity (%)", a "thermal expansion coefficient ($\times 10^{-6}$/T)", "A-axis compressive strength (MPa)" and a "median diameter (μm)" were measured in the same manner as in Example 1. Table 3 shows the measurement results. Furthermore, chemical components of the honeycomb structure of Example 2 were measured in the same manner as in Example 1. Table 3 shows the chemical components of the honeycomb structure of Example 2.

Example 3

The procedures of Example 1 were repeated except that as glass frit, "aluminosilicate glass B" of such a chemical composition as shown in Table 2 was used, to prepare a honeycomb structure of Example 3. As to the obtained honeycomb structure, "porosity (%)", a "thermal expansion coefficient ($\times 10^{-6}$/° C.)", "A-axis compressive strength (MPa)" and a "median diameter (μm)" were measured in the same manner as in Example 1. Table 3 shows the measurement results. Furthermore, chemical components of the honeycomb structure of Example 3 were measured in the same manner as in Example 1. Table 3 shows the chemical components of the honeycomb structure of Example 3.

Examples 4 to 7

The procedures of Example 1 were repeated except that a glass type, clay, a firing temperature and respective blend ratios were changed as shown in Table 1 and except that a partition wall thickness, a cell density and a diameter were changed as shown in Table 3, to prepare honeycomb structures of Examples 4 to 7. As to each obtained honeycomb structure, "porosity (%)", a "thermal expansion coefficient ($\times 10^{-6}$/° C.)", "A-axis compressive strength (MPa)" and a "median diameter (μm)" were measured in the same manner as in Example 1. Table 3 shows the measurement results. Furthermore, chemical components of the honeycomb structures of Examples 4 to 7 were measured in the same manner as in Example 1. Table 3 shows the chemical components of the honeycomb structures of Examples 4 to 7.

Examples 8 to 14

The procedures of Example 1 were repeated except that a glass type, clay, a firing temperature and respective blend ratios were changed as shown in Table 1 and except that a partition wall thickness, a cell density and a diameter were changed as shown in Table 3, to prepare honeycomb structures. In Examples 8 to 14, "soda glass" of such a chemical composition as shown in Table 2 was used as glass fit. As to each obtained honeycomb structure, "porosity (%)", a "thermal expansion coefficient ($\times 10^{-6}$/° C.)", "A-axis compressive strength (MPa)" and a "median diameter (μm)" were measured in the same manner as in Example 1. Table 3 shows the measurement results. Furthermore, chemical components of the honeycomb structures of Examples 8 to 14 were measured in the same manner as in Example 1. Table 3 shows the chemical components of the honeycomb structures of Examples 8 to 14.

Comparative Examples 1 and 2

The procedures of Example 1 were repeated except that a firing temperature was changed as shown in Table 1 and except that a partition wall thickness, a cell density and a diameter were changed as shown in Table 3, to prepare honeycomb structures of Comparative Examples 1 and 2. As to each obtained honeycomb structure, "porosity (%)", a "thermal expansion coefficient ($\times 10^{-6}$/° C.)", "A-axis compressive strength (MPa)" and a "median diameter (μm)" were measured in the same manner as in Example 1. Table 3 shows the measurement results. Furthermore, chemical components of the honeycomb structures of Comparative Examples 1 and 2 were measured in the same manner as in Example 1. Table 3 shows the chemical components of the honeycomb structures of Comparative Examples 1 and 2. In Comparative Example 1, the firing temperature was set to 1100° C., and the thermal expansion coefficient thereby indicated a high value of $6.4 \times 10^{-6}$/° C. In Comparative Example 2, the firing temperature was set to 1200° C., and the thermal expansion coefficient thereby indicated a high value of $11.1 \times 10^{-6}$/° C. It is presumed that in Comparative Examples 1 and 2, at least a part of molten silica particles and glass was crystallized into cristobalite or the like during firing and the thermal expansion coefficient enlarged.

Comparative Examples 3 to 5

The procedures of Example 8 were repeated except that clay, a firing temperature and respective blend ratios were changed as shown in Table 1 and except that a partition wall thickness, a cell density and a diameter were changed as shown in Table 3, to prepare honeycomb structures of Comparative Examples 3 to 5. As to each obtained honeycomb structure, "porosity (%)", a "thermal expansion coefficient ($\times 10^{-6}$/° C.)", "A-axis compressive strength (MPa)" and a "median diameter (μm)" were measured in the same manner as in Example 1. Table 3 shows the measurement results. Furthermore, chemical components of the honeycomb structures of Comparative Examples 3 to 5 were measured in the same manner as in Example 1. Table 3 shows the chemical components of the honeycomb structures of Comparative Examples 3 to 5. Additionally, in Comparative Example 5, the thermal expansion coefficient was unmeasurable due to insufficient strength of the honeycomb structure. A column of "thermal expansion coefficient" shows "unmeasurable" for Comparative Example 5.

Reference Example 1

In Reference Example 1, a solid type catalyst was used. "Porosity (%)", a "thermal expansion coefficient ($\times 10^{-6}$/° C.)", "A-axis compressive strength (MPa)" and a "median diameter (μm)" were measured in the same manner as in Example 1. Table 3 shows the measurement results. Furthermore, chemical components of the solid type catalyst of Reference Example 1 were measured in the same manner as in Example 1. Table 3 shows the chemical components of the solid type catalyst of Reference Example 1. The solid type catalyst in Reference Example 1 included vanadium oxide having a melting point of 675° C., and hence as the thermal expansion coefficient, the thermal expansion coefficient at 40 to 600° C. was measured.

Comparative Example 6

In Comparative Example 6, a plurality of materials selected from a group consisting of talc, kaolin, calcinated kaolin, alumina, aluminum hydroxide and silica were combined to prepare a cordierite forming raw material. The materials were blended at predetermined ratios so that a chemical composition of the cordierite forming raw material included 42 to 56 mass % of $SiO_2$, 0 to 45 mass % of $Al_2O_3$, and 12 to 16 mass % of MgO. To the cordierite forming raw material prepared in this manner, graphite and a synthetic resin as pore formers were added as much as an amount required to obtain a targeted porosity. Furthermore, appropriate amounts of methylcellulose and a surfactant were added, respectively, and then water was added, followed by kneading, to prepare a kneaded material. The prepared kneaded material was subjected to vacuum deaeration and then extruded to obtain a honeycomb formed body. The honeycomb formed body was prepared so as to obtain a partition wall thickness of 170 μm and a cell density of 62 cells/cm² after fired. Next, the honeycomb formed body was dried to obtain a honeycomb dried body. As to the drying, microwave drying was first performed and then hot air drying was performed. Next, the honeycomb dried body was cut so that a length of the honeycomb dried body in a cell extending direction became a predetermined length, and the honeycomb dried body was degreased. Next, the degreased honeycomb dried body was fired to obtain a honeycomb structure of Comparative Example 6. The firing was performed at 1410 to 1440° C. The obtained honeycomb structure had a round pillar shape in which a diameter of each end face was 144 mm and a length in the cell extending direction was 153 mm. Furthermore, in the obtained honeycomb structure, a honeycomb structure body had a circumferential wall having a thickness of 1.13 mm at the outermost circumference of the honeycomb structure body. As to the obtained honeycomb structure, "porosity (%)", a "thermal expansion coefficient ($\times 10^{-6}$/° C.)", "A-axis compressive strength (MPa)" and a "median diameter (μm)" were measured in the same manner as in Example 1. Table 3 shows the measurement results. In addition, chemical components of the honeycomb structure of Comparative Example 6 were measured in the same manner as in Example 1. Table 3 shows the chemical components of the honeycomb structure of Comparative Example 6.

(Results)

In a honeycomb structure for use as an exhaust gas purifying catalyst carrier to purify an exhaust gas, a thermal expansion coefficient is preferably as low as possible from the viewpoint of a thermal shock resistance. Specifically, from the viewpoint of the thermal shock resistance, the thermal expansion coefficient of the honeycomb structure is preferably $6.0 \times 10^{-6}$/° C. or less. On the other hand, from the viewpoint of a peeling resistance of a catalyst layer constituted of a catalyst loaded onto the honeycomb structure, a difference in thermal expansion coefficient between the honeycomb structure and the catalyst layer is preferably as small as possible. A honeycomb structure made of cordierite having low thermal expansion as in the honeycomb structure of Comparative Example 6 is known for the problem that the catalyst layer peels off, and has a thermal expansion coefficient of about 0.5 to $1.0 \times 10^{-6}$/° C. ($0.5 \times 10^{-6}$/° C. in Comparative Example 6). To avoid the abovementioned problem that the catalyst layer peels off, the thermal expansion coefficient of the honeycomb structure is preferably $1.5 \times 10^{-6}$/° C. or more. The thermal expansion coefficient of the catalyst layer is about $6.0 \times 10^{-6}$/° C. (in the solid type catalyst of Reference Example 1, $6.5 \times 10^{-6}$/° C.). When the thermal expansion coefficient of the honeycomb structure is in excess of the thermal expansion coefficient of the catalyst layer, both the thermal shock resistance and the peeling resistance worsen.

It is seen from the measurement results of the thermal expansion coefficient shown in Table 3 that each of the honeycomb structures of Examples 1 to 14 is more excellent in balance between the thermal shock resistance and the peeling resistance than each of the honeycomb structures of Comparative Examples 1 to 6. In the honeycomb structure of Comparative Example 3, porosity is low, and hence a catalyst retaining performance is low. Therefore, even when the difference in thermal expansion coefficient between the honeycomb structure and the catalyst layer is small, the catalyst layer easily peels off. The honeycomb structure of Comparative Example 5 has such a low mechanical strength that a sample to measure the thermal expansion coefficient cannot be cut out therefrom, and the honeycomb structure cannot be resistant to actual use.

A honeycomb structure of the present invention can be utilized as an exhaust gas purifying catalyst carrier to purify an exhaust gas.

DESCRIPTION OF REFERENCE NUMERALS 1 and 31: partition wall, 2 and 32: cell, 3 and 33: circumferential wall, 4 and 34: honeycomb structure body, 7: aggregates, 8: bonding material, 9: pore, 10: porous body, 11 and 41: first end face (end face), 12 and 42: second end face (end face), 35: catalyst, and 100 and 200: honeycomb structure.

What is claimed is:

1. A honeycomb structure comprising a pillar-shaped honeycomb structure body having partition walls defining a plurality of cells which become through channels for a fluid and extend from a first end face to a second end face,
    wherein the partition walls are constituted of a porous body having aggregates and a bonding material to bond the aggregates to one another in a state where pores are formed among the aggregates, the aggregates include molten silica particles, and the bonding material includes glass, and
    a content ratio of $SiO_2$ in the porous body is 70 mass % or more, and a thermal expansion coefficient of the porous body at 40 to 800° C. is from 1.5 to $6.0 \times 10^{-6}$/° C.

2. The honeycomb structure according to claim 1,
    wherein porosity of the partition walls is from 10 to 60%.

3. The honeycomb structure according to claim 2,
    wherein a mass ratio of an alkali metal included in the porous body is from 10 mass % or less.

4. The honeycomb structure according to claim 3,
    which further comprises a catalyst loaded onto at least one of each surface of the partition walls and each pore formed in the partition walls, and including titanium oxide as a main component and further including tungsten oxide and vanadium oxide.

5. The honeycomb structure according to claim 2,
    which further comprises a catalyst loaded onto at least one of each surface of the partition walls and each pore formed in the partition walls, and including titanium oxide as a main component and further including tungsten oxide and vanadium oxide.

6. The honeycomb structure according to claim 1, wherein a mass ratio of an alkali metal included in the porous body is from 10 mass % or less.

7. The honeycomb structure according to claim 6, which further comprises a catalyst loaded onto at least one of each surface of the partition walls and each pore formed in the partition walls, and including titanium oxide as a main component and further including tungsten oxide and vanadium oxide.

8. The honeycomb structure according to claim 1, which further comprises a catalyst loaded onto at least one of each surface of the partition walls and each pore formed in the partition walls, and including titanium oxide as a main component and further including tungsten oxide and vanadium oxide.

* * * * *